United States Patent
Eboshi et al.

(10) Patent No.: US 12,059,749 B2
(45) Date of Patent: Aug. 13, 2024

(54) WAVELENGTH CONVERSION MEMBER MANUFACTURING METHOD AND METHOD FOR MANUFACTURING LIGHT-EMITTING DEVICE

(71) Applicant: NICHIA CORPORATION, Anan (JP)

(72) Inventors: Naoki Eboshi, Tokushima (JP); Hiroaki Yuto, Awa (JP)

(73) Assignee: NICHIA CORPORATION, Anan (JP)

( * ) Notice: Subject to any disclaimer, the term of this patent is extended or adjusted under 35 U.S.C. 154(b) by 571 days.

(21) Appl. No.: 17/364,657

(22) Filed: Jun. 30, 2021

(65) Prior Publication Data
US 2021/0323094 A1    Oct. 21, 2021

Related U.S. Application Data

(62) Division of application No. 15/648,780, filed on Jul. 13, 2017, now Pat. No. 11,084,128.

(30) Foreign Application Priority Data

Jul. 22, 2016 (JP) .................................. 2016-143875

(51) Int. Cl.
*B23K 26/364* (2014.01)
*B23K 26/00* (2014.01)
(Continued)

(52) U.S. Cl.
CPC ........ *B23K 26/364* (2015.10); *B23K 26/0006* (2013.01); *B23K 26/0624* (2015.10);
(Continued)

(58) Field of Classification Search
CPC .. B23K 26/40; B23K 26/0626; B23K 26/364; B23K 26/389; B23K 26/402;
(Continued)

(56) References Cited

U.S. PATENT DOCUMENTS 10,180,237 B2 * 1/2019 Sano .......................... F21V 5/10
10,544,931 B2 * 1/2020 Yamashita ............... H04N 9/31
(Continued)

FOREIGN PATENT DOCUMENTS

EP           2017030 A1    1/2009
JP       2009-022978 A     2/2009
(Continued)

OTHER PUBLICATIONS

English translation of JP-2015144180-A (Year: 2015).*
(Continued)

*Primary Examiner* — Chris Q Liu
(74) *Attorney, Agent, or Firm* — Global IP Counselors, LLP

(57) ABSTRACT

A wavelength conversion member manufacturing method includes: providing the wavelength conversion member having an upper surface, the wavelength conversion member including a phosphor portion, and a light-transmissive portion configured to transmit fluorescence from the phosphor portion; and forming, in the wavelength conversion member, at least one depressed portion each having an inclined surface inclined with respect to the upper surface by irradiating the wavelength conversion member with a pulsed laser beam from above more than once to form a plurality of continuous machining marks at different processing depths.

9 Claims, 9 Drawing Sheets

(51) Int. Cl.
*B23K 26/0622* (2014.01)
*B23K 26/08* (2014.01)
*B23K 26/359* (2014.01)
*B23K 26/402* (2014.01)
*F21K 9/64* (2016.01)
*F21K 9/90* (2016.01)
*B23K 101/36* (2006.01)
*B23K 103/00* (2006.01)
*F21Y 115/30* (2016.01)

(52) U.S. Cl.
CPC .......... *B23K 26/083* (2013.01); *B23K 26/359* (2015.10); *B23K 26/402* (2013.01); *F21K 9/64* (2016.08); *F21K 9/90* (2013.01); *B23K 2101/36* (2018.08); *B23K 2103/52* (2018.08); *F21Y 2115/30* (2016.08)

(58) Field of Classification Search
CPC ............ B23K 26/0006; B23K 26/0622; B23K 26/0624; B23K 26/073; B23K 26/08; B23K 26/082; B23K 26/083; B23K 26/0869; B23K 26/352; B23K 26/3584; B23K 26/359; B23K 26/361; B23K 26/38
USPC ......................................... 219/121.69–121.8
See application file for complete search history.

(56) References Cited

U.S. PATENT DOCUMENTS

| | | | |
|---|---|---|---|
| 10,907,773 B2 * | 2/2021 | Murai | ...................... F21K 9/68 |
| 2007/0018634 A1 | 1/2007 | Ohtake et al. | |
| 2016/0061391 A1 | 3/2016 | Inoue et al. | |
| 2016/0129526 A1 | 5/2016 | Russ et al. | |

FOREIGN PATENT DOCUMENTS

| | | | |
|---|---|---|---|
| JP | 2011-165549 A | | 8/2011 |
| JP | 2011-256072 A | | 12/2011 |
| JP | 2012093454 A | | 5/2012 |
| JP | 2015-041475 A | | 3/2015 |
| JP | 2015144180 A | * | 8/2015 |
| WO | 2014-119783 A1 | | 8/2014 |

OTHER PUBLICATIONS

Restriction Requirement in the related U.S. Appl. No. 15/648,780, dated Jan. 16, 2020.
Non-Final Office Action in the related U.S. Appl. No. 15/648,780, dated Nov. 4, 2020.
Notice of Allowance in the related U.S. Appl. No. 15/648,780, dated Apr. 30, 2021.

* cited by examiner

WAVELENGTH CONVERSION MEMBER MANUFACTURING METHOD AND METHOD FOR MANUFACTURING LIGHT-EMITTING DEVICE

CROSS-REFERENCE TO RELATED APPLICATION

This application is a divisional application of U.S. patent application Ser. No. 15/648,780, filed on Jul. 13, 2017. The present application claims priority to Japanese Patent Application No. 2016-143875, filed on Jul. 22, 2016. The entire disclosures of U.S. patent application Ser. No. 15/648,780 and Japanese Patent Application No. 2016-143875 are hereby incorporated herein by reference.

BACKGROUND

1. Field of the Invention

The present invention relates to a wavelength conversion member manufacturing method and a method for manufacturing a light-emitting device including the wavelength conversion member.

2. Description of Related Art

A known light source device includes a semiconductor laser element and a phosphor layer disposed away from the semiconductor laser element and having a plurality of inclined surface structures on its surface (see Japanese Unexamined Patent Application Publication No. 2015-41475). Examples of the form of the phosphor layer include a member in which phosphor powder is dispersed in glass or resin, and a phosphor ceramic. Examples of the method for forming the inclined surface structures include microlithography.

SUMMARY

However, etching with the lithography technique leads to differences in etching rates between materials. Hence, in the case where a phosphor layer to be used contains a mixture of a phosphor and another material, it is difficult to obtain an intended shape by etching. Another example of the method for forming a depressed portion in the phosphor layer is a mechanical machining using a blade or the like. However, the shape of the resulting depressed portion changes as the machining progresses because the blade or the like gets worn due to the machining.

The present disclosure includes the following aspects of the invention. According to one aspect of the invention, a wavelength conversion member manufacturing method includes: providing the wavelength conversion member having an upper surface, the wavelength conversion member including a phosphor portion, and a light-transmissive portion configured to transmit fluorescence from the phosphor portion; and forming, in the wavelength conversion member, at least one depressed portion each having an inclined surface inclined with respect to the upper surface by irradiating the wavelength conversion member with a pulsed laser beam from above more than once to form a plurality of continuous machining marks at different processing depths.

According to another aspect of the invention, a wavelength conversion member manufacturing method includes: providing the wavelength conversion member having an upper surface, the wavelength conversion member including a phosphor portion, and a light-transmissive portion configured to transmit fluorescence from the phosphor portion; and forming, in the wavelength conversion member, at least one depressed portion each having an inclined surface inclined with respect to the upper surface by irradiating the wavelength conversion member with a pulsed laser beam from above more than once to form a plurality of continuous sets of machining marks at different processing depths, each of the continuous sets of the machining marks having a plurality of continuous machining marks at a fixed processing depth.

These methods each enable a depressed portion having a desired shape to be formed in a wavelength conversion member including a phosphor portion and a light-transmissive portion.

DETAILED DESCRIPTION OF EMBODIMENTS

The following describes embodiments of the invention with reference to the accompanying drawings as appropriate. A wavelength conversion member and a light-emitting device to be described below are intended to embody the technical concept of the present invention and are not intended to limit the present invention to the member and the device below unless specifically stated otherwise. It should be noted that there is a case where magnitudes or positional relations of members illustrated in each drawing are exaggerated in order to clarify the descriptions.

First Embodiment

Figure 1A:
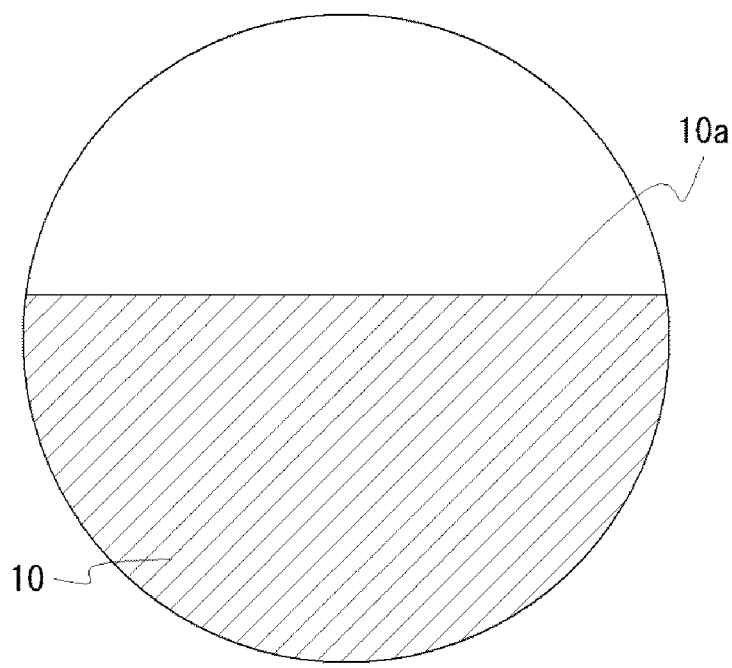
FIG. 1A is a schematic sectional view for illustrating a method for manufacturing a wavelength conversion member having a depressed portion according to a first embodiment.
Figure 1B:
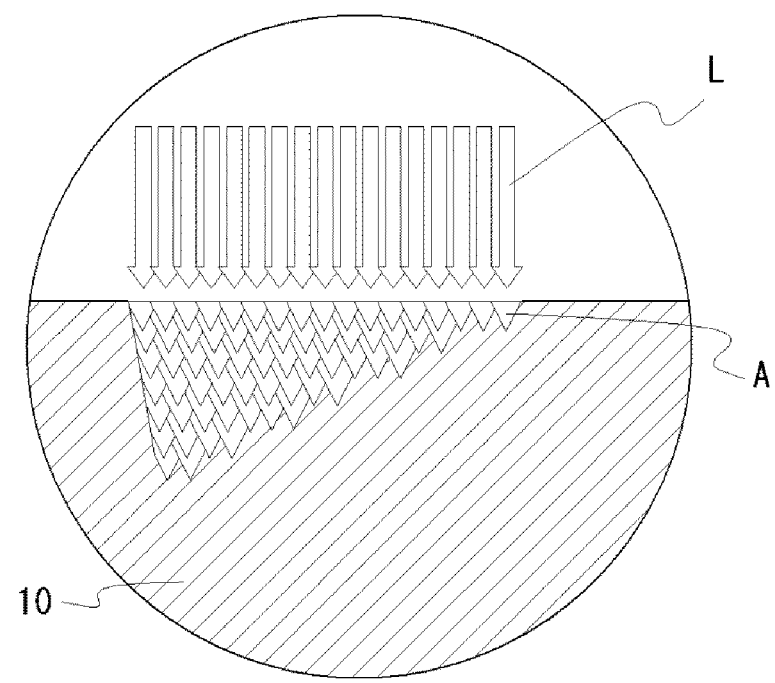
FIG. 1B is a schematic sectional view for illustrating the method for manufacturing the wavelength conversion member having the depressed portion according to the first embodiment.
Figure 1C:
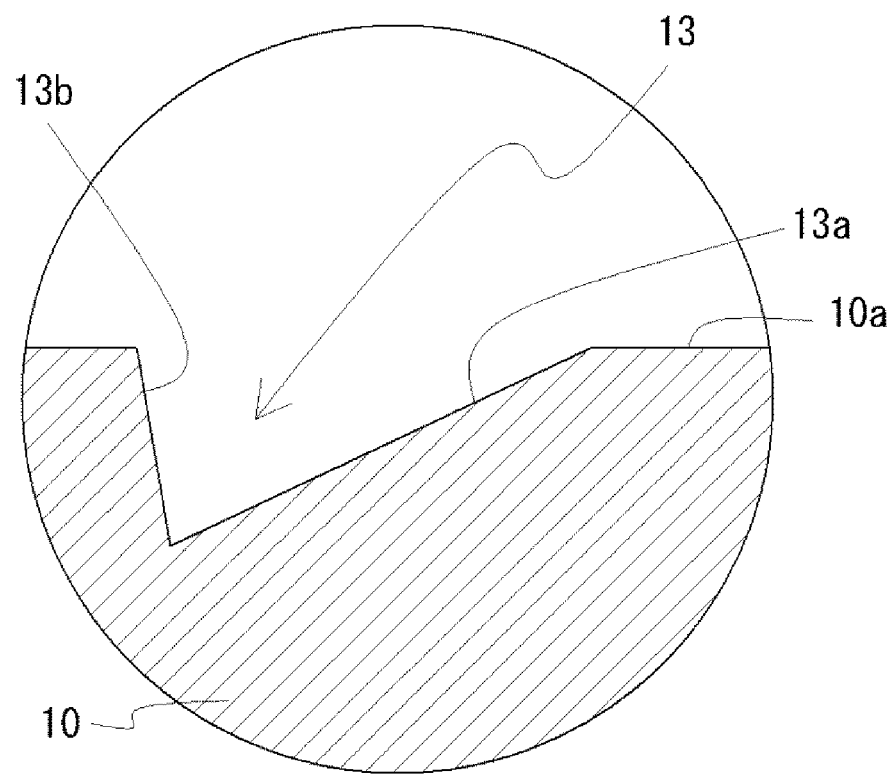
FIG. 1C is a schematic sectional view for illustrating the method for manufacturing the wavelength conversion member having the depressed portion according to the first embodiment.

FIGS. 1A to 1C are schematic sectional views for illustrating a method for manufacturing a wavelength conversion member 10 having a depressed portion 13 according to a first embodiment. FIGS. 1A to 1C are schematic enlarged views of part of the wavelength conversion member 10.

First, the wavelength conversion member 10 having an upper surface 10a as shown in FIG. 1A is provided. The wavelength conversion member 10 includes a phosphor portion and a light-transmissive portion that transmits fluorescence from the phosphor portion.

Next, the wavelength conversion member 10 is irradiated with a pulsed laser beam L from above more than once to form a plurality of continuous machining marks A as shown in FIG. 1B. The depressed portion 13 having inclined surfaces 13a and 13b inclined with respect to the upper surface 10a is thus formed in the wavelength conversion member 10 as shown in FIG. 1C.

Through these steps, the depressed portion 13 having a desired shape can be formed in the wavelength conversion member 10 including the phosphor portion and the light-transmissive portion. That is, differences in processing rates between different materials are smaller in machining with the pulsed laser beam L than in the case of etching, and an intended shape can be easily obtained.

A detailed procedure of the forming of the depressed portion 13 will be described referring to FIGS. 2A to 2F. FIGS. 2A to 2F are schematic perspective views for illustrating the forming of the depressed portion 13.

Figure 2A:
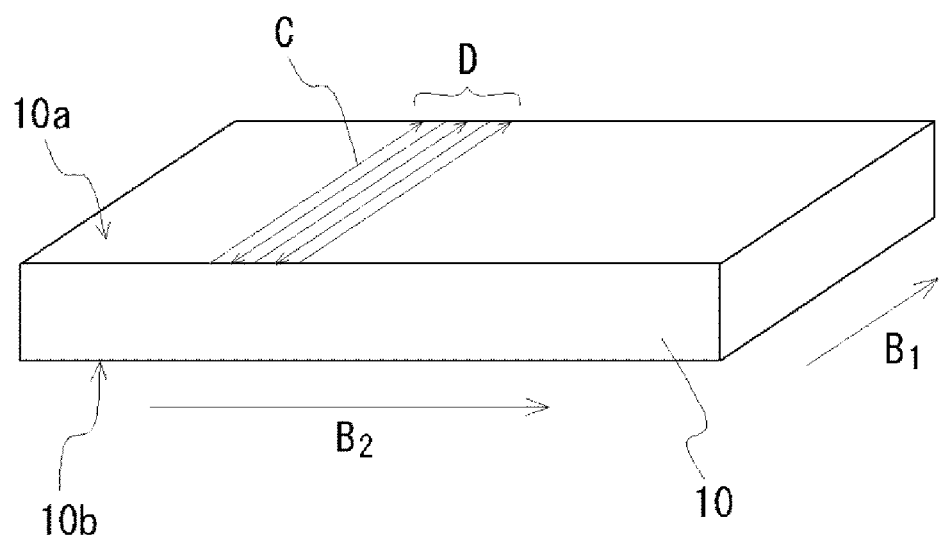
FIG. 2A is a schematic perspective view for illustrating an illustrative step of forming the depressed portion.

In a top view, a predetermined direction is referred to as a first direction $B_1$, and a direction perpendicular to the first direction $B_1$ is referred to as a second direction $B_2$ as shown in FIG. 2A. Scanning with the pulsed laser beam L at a fixed processing depth along the first direction $B_1$ is referred to as Step C of scanning. The fixed processing depth herein includes not only identical processing depths but processing depths that are substantially the same. Performing Step C of scanning more than once at irradiation positions shifted in the second direction $B_2$ is referred to as Set D of scanning. As shown in FIGS. 2A to 2F, such Set D of scanning is performed more than once at different processing depths in regions overlapping each other in a top view to form the depressed portion 13. The processing depth is based on the upper surface 10a of the wavelength conversion member 10 before the depressed portion 13 is formed. For example, in the wavelength conversion member 10 shown in FIG. 1B, machining marks A shown laterally indicate a fixed depth, and machining marks A shown vertically indicate different processing depths. To apply the pulsed laser beam L at a fixed processing depth, the pulsed laser beam L is applied with the depth of the focus and conditions that affect the size of the machining marks A, such as an output, being fixed.

In the forming of the depressed portion 13, it is preferable to perform a plurality of Set D of scanning so that the processing depth increases as the machining position becomes closer to the lower end. That is, it is preferable to perform Set D of scanning at the shallowest processing depth first among Sets D of scanning required for forming the depressed portion 13 and then gradually increase the processing depth. Furthermore, each of the machining marks A formed by applying the pulsed laser beam L preferably has a depressed shape that opens upward. If the machining marks A are formed inside the wavelength conversion member 10, the wavelength conversion member 10 may be broken because of cracks starting from the machining marks A. Hence, to reduce the possibility of breakage of the wavelength conversion member 10, surface machining is preferably performed instead of internal machining so that the machining marks A each have a depressed shape that opens upward. Such machining is possible if the machining is performed from an upper processing depth to a lower processing depth. The lower direction is the direction from the upper surface 10a toward a lower surface 10b that is opposite to the upper surface 10a.

Figure 2B:
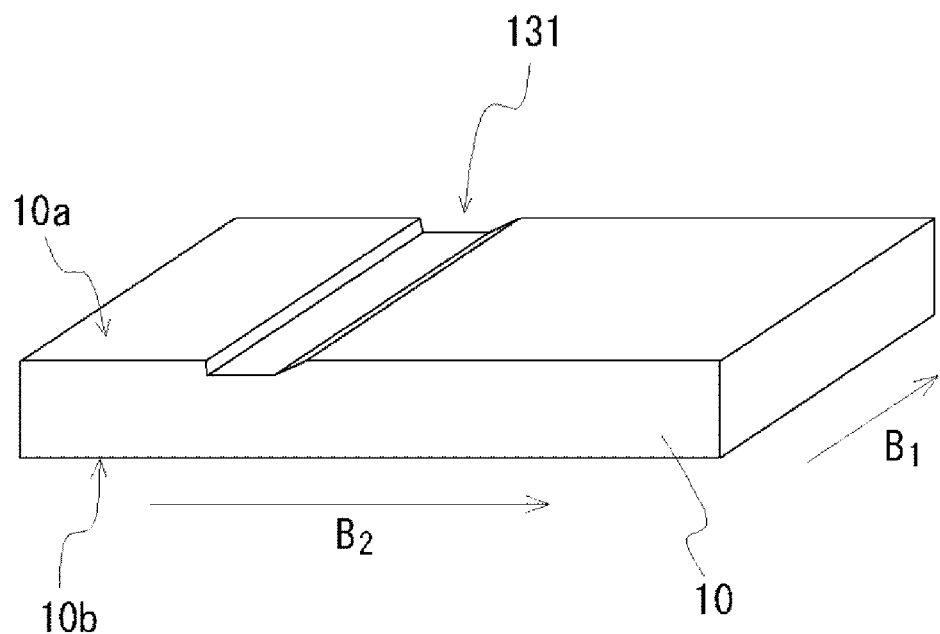
FIG. 2B is a schematic perspective view for illustrating an illustrative step of forming the depressed portion.
Figure 2C:
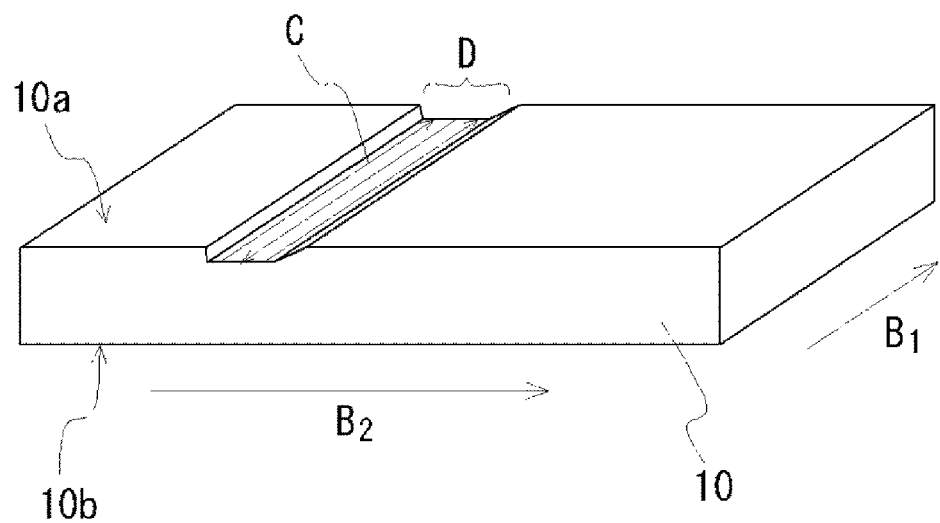
FIG. 2C is a schematic perspective view for illustrating an illustrative step of forming the depressed portion.
Figure 2D:
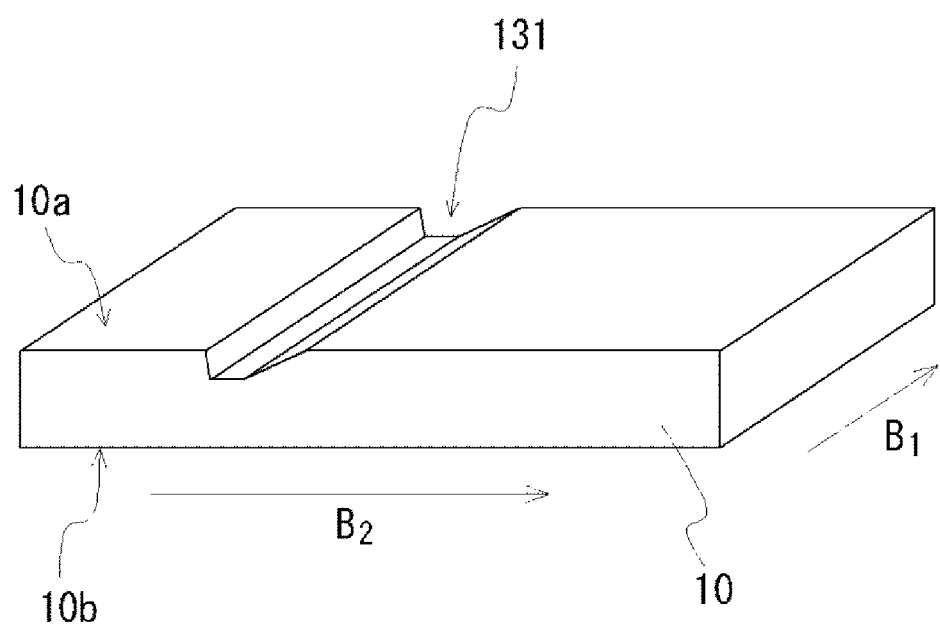
FIG. 2D is a schematic perspective view for illustrating an illustrative step of forming the depressed portion.
Figure 2E:
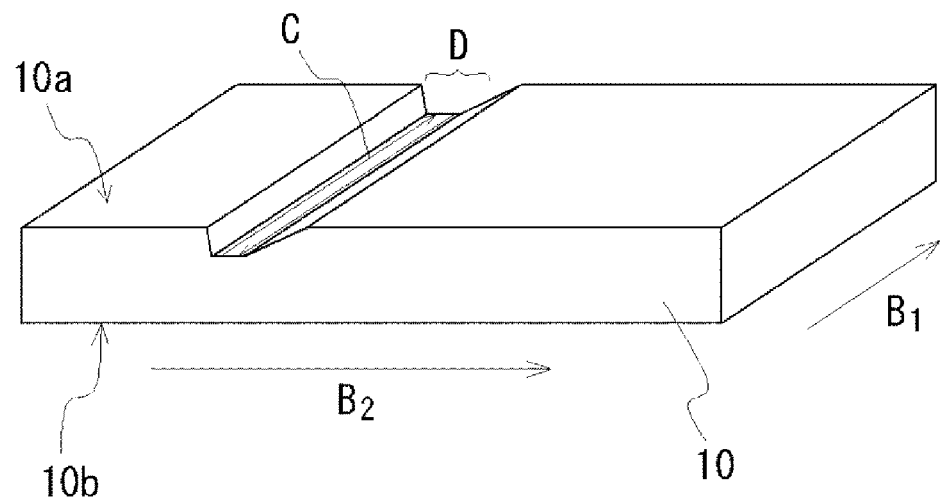
FIG. 2E is a schematic perspective view for illustrating an illustrative step of forming the depressed portion.
Figure 2F:
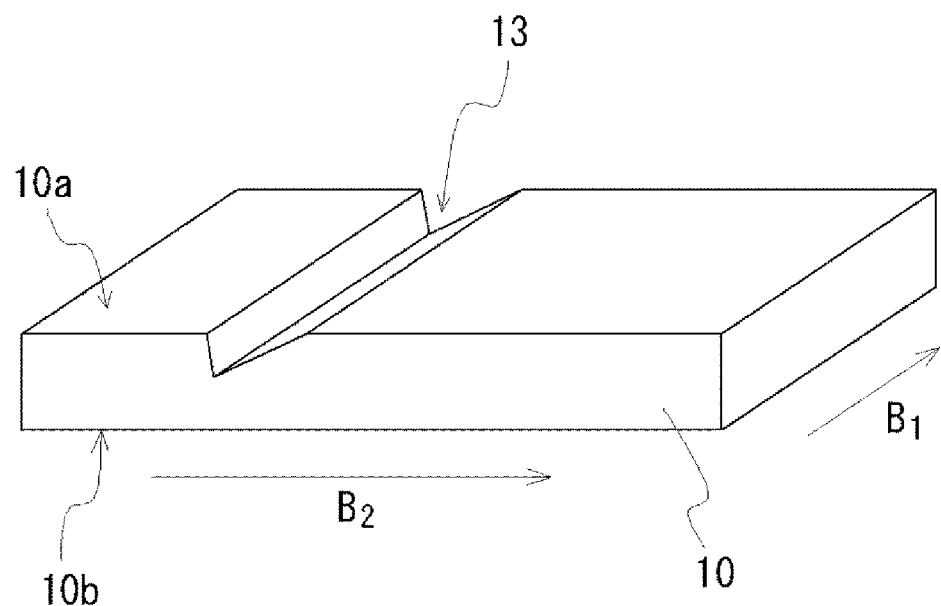
FIG. 2F is a schematic perspective view for illustrating an illustrative step of forming the depressed portion.

First, performing Step C of scanning once forms a groove formed of continuous machining marks A in a line along the first direction $B_1$ at substantially the same depths. Performing Set D of scanning, in which such Step C of scanning is performed more than once, forms a shallow groove 131 as shown in FIG. 2B. The shallow groove 131 has a bottom surface substantially parallel to the upper surface 10a. All Steps C of scanning may be performed in the same direction but are preferably performed back and forth, that is, performed in alternating opposite scanning directions. The machining time can be thus reduced. The positions in the second direction $B_2$ of focuses in Steps C of scanning in Set D of scanning are such that the machining marks A of different steps will be continuous with each other.

Such Set D of scanning is performed more than once successively downward in regions overlapping each other in a top view to form the depressed portion 13. That is, as shown in FIGS. 2C to 2F, Set D of scanning is performed again on the bottom surface of the shallow groove 131 to form a new shallow groove 131. Through digging gradually deeper in this manner, the depressed portion 13 gets deeper. Also, the inclined surfaces 13a and 13b of the depressed portion 13 get flatter when machining marks at the edges of one of a plurality of shallow grooves 131 successively formed are formed continuously with machining marks at the edges of another one of the shallow grooves 131. Also, the depressed portion 13 having a desired shape can be formed by adjusting the positions at which the shallow grooves 131 are formed and the lengths of the shallow grooves 131 in the second direction $B_2$. The number of times of Step C of scanning in each Set D of scanning is preferably reduced as the distance from the upper surface 10a increases. This procedure forms the depressed portion 13 the length of which in the second direction $B_2$ decreases as the distance from the upper surface 10a increases.

For example, in laser machining with a pulsed laser beam in which only machining marks at substantially the same depths are formed continuously, the resulting depressed portion will have a shape that directly reflects laser irradiation conditions such as the radiation direction and spot diameter of the pulsed laser beam. In the present embodiment, however, Set D of scanning is performed more than once successively downward as shown in FIGS. 2C to 2F to form the continuous machining marks A, thereby forming the depressed portion 13. In this method, selecting combinations of the number of times and positions in a top view of Sets D of scanning enables a desired shape to be obtained. The following describes each step in detail.

Providing Wavelength Conversion Member 10

First, the wavelength conversion member 10 that includes the phosphor portion and the light-transmissive portion is provided. Typically, the wavelength conversion member 10 is a sintered body of a phosphor and a ceramic. The light-transmissive portion is made of a material different from the material of the phosphor portion. The light-transmissive portion is preferably different in refractive index from the phosphor portion. In that case, light can be scattered within the wavelength conversion member 10 due to the difference in refractive index and extracted from the upper surface 10a.

The phosphor portion is excited by first light (excitation light) and emits second light that is fluorescence. Mixing the first light and the second light provides, for example, white light. The phosphor portion is made of, for example, one type of phosphor. In the case where the first light is blue, selecting yellow light as the second light provides white light as the mixture of the first and second light. The wavelength conversion member 10 may contain two or more types of phosphor. For example, red light may be added as the second light in addition to the yellow light. Examples of the phosphor that emits yellow light include YAG phosphors and LAG phosphors. Examples of the phosphor that emits red light include CASN phosphors. $Al_2O_3$ is an example of a material that constitutes the light-transmissive portion and differs in refractive index from the phosphor portion.

Figure 3A:
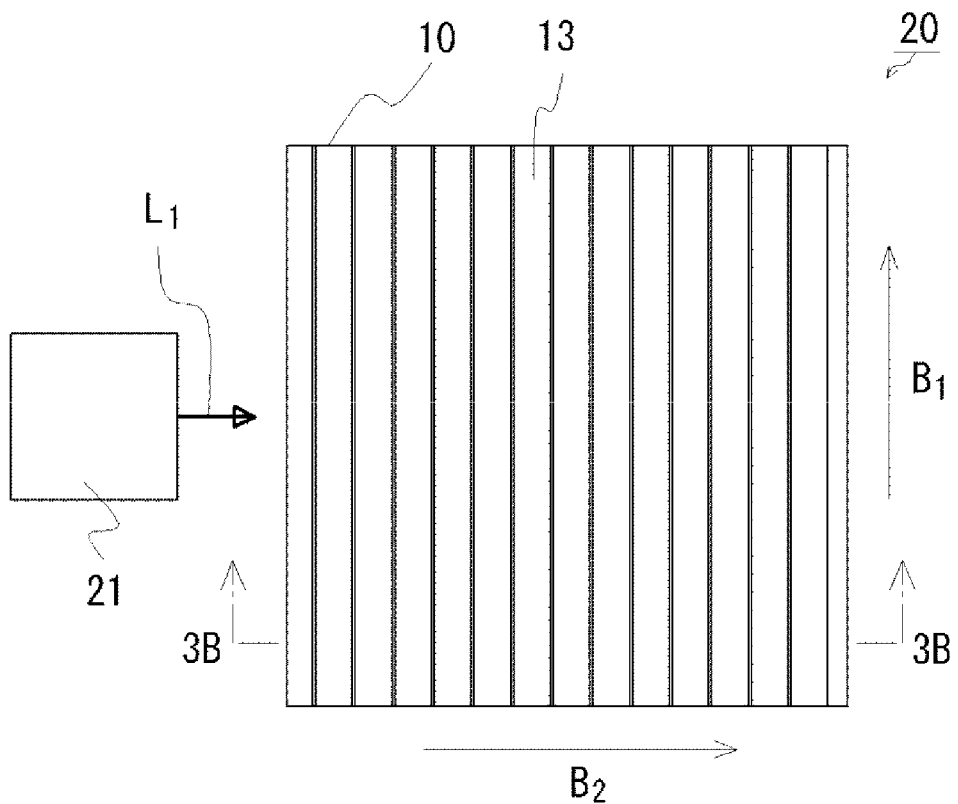
FIG. 3A is a schematic top view of a light-emitting device according to the first embodiment.
Figure 3B:
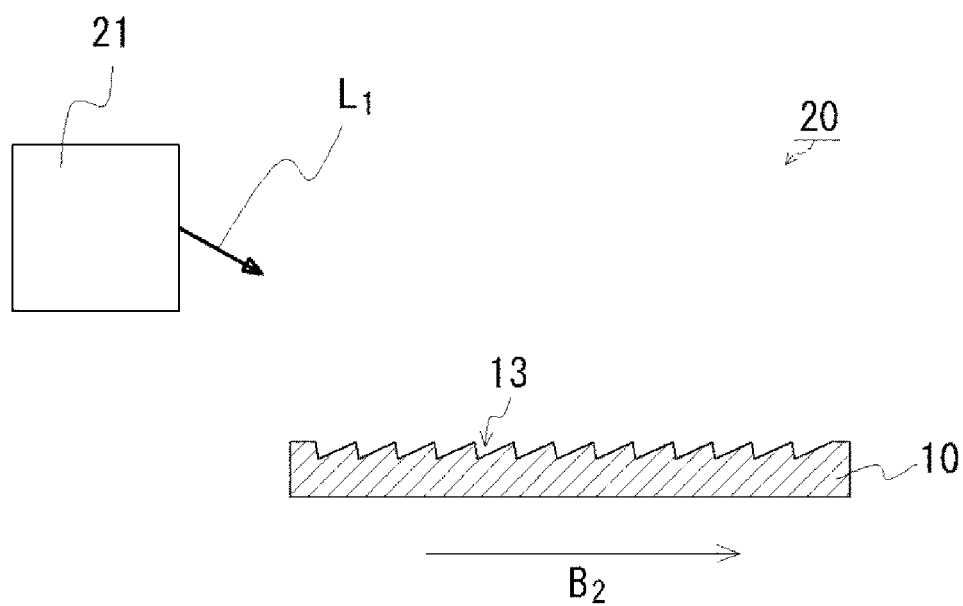
FIG. 3B is a schematic sectional view taken along the line 3B-3B in FIG. 3A.

The proportion of the phosphor portion to the wavelength conversion member 10 is, for example, about 60 to 90 vol %. The wavelength conversion member 10 including the phosphor portion as a main part is suitable for a reflective light-emitting device 20 in which a surface irradiated with the first light serves as the light-extracting surface as shown in FIGS. 3A and 3B described later. In this wavelength conversion member 10, it is difficult for light to reach the lower surface 10b, and light is easily extracted from the upper surface 10a. The portion other than the phosphor portion of the wavelength conversion member 10 can be substantially made of the light-transmissive portion. The wavelength conversion member 10 may include a material other than the phosphor portion and the light-transmissive portion, such as a scattering agent.

The thickness of the wavelength conversion member 10 can be, for example, about 80 to 250 μm. The outer edges of the wavelength conversion member 10 form, for example, a circle, ellipse, rectangle, or another polygon in a top view. For example, in the case of a wavelength conversion member 10 having a rectangular shape in a top view, the length of one side can be about 0.2 to 2.0 mm, more specifically about 0.3 to 1.0 mm.

Forming Depressed Portion

Next, the wavelength conversion member 10 is irradiated with the pulsed laser beam L from above more than once to form the continuous machining marks A, thereby forming the depressed portion 13. For example, the depressed portion 13 having a desired shape can be formed by successively forming the machining marks A shown in FIG. 1B one by one. Alternatively, in the case where a plurality of emitting units of the pulsed laser beam L are provided, a plurality of machining marks A can be formed at once.

A smaller size of the machining marks A enables the inclined surfaces 13a and 13b to be flatter. Provided that the resulting depressed portion 13 has a fixed size, reducing the size of the machining marks A increases the number of the machining marks A required for providing one depressed portion 13. Hence, the larger the number of times of Set D of scanning required for forming one depressed portion 13 is, the flatter the inclined surfaces 13a and 13b tend to be. Accordingly, the number of times of Set D of scanning in forming one depressed portion 13 is preferably three or more. On the other hand, a larger number of times of Set D of scanning increase the machining time. Accordingly, the number of times of Set D of scanning in forming one depressed portion 13 is preferably 30 or less, more preferably 15 or less.

For example, the depressed portion 13 defined by the two inclined surfaces 13a and 13b in a sectional view parallel to the second direction $B_2$ and perpendicular to the upper surface 10a can be formed. In the case of forming such a depressed portion 13 that has substantially no bottom surface, irradiation with the pulsed laser beam L at the largest processing depth, that is, the last irradiation with the pulsed laser beam L, may be one Step C of scanning or may be Set D of scanning including performing Step C of scanning more than once. In the case where the last irradiation with the pulsed laser beam L is Set D of scanning, the number of times of Step C of scanning constituting the Set D of scanning is, for example, in a range of 2 to 5.

For example, a laser scribing apparatus is used for irradiation with the pulsed laser beam L. Examples of a laser light source that emits the pulsed laser beam L include Ti:sapphire lasers, Yb:KGW lasers, and Nd:YVO$_4$ lasers.

Examples of the pulsed laser beam L include laser beams having pulse widths of the order of nanoseconds or femtoseconds. In the present embodiment, a laser beam having a femtosecond-order pulse width is preferable. Specifically, the order of femtoseconds includes 100 to 10,000 fs. A nanosecond-order pulsed laser beam L generates a dark-colored deteriorated layer along with formation of the machining marks A, but a femtosecond-order pulsed laser beam L less generates the dark-colored deteriorated layer. Accordingly, cleaning for removing the dark-colored deteriorated layer can be omitted. In the case where machining with the femtosecond-order pulsed laser beam L generates shavings (debris) adhering to the depressed portion 13 and its vicinities, a simple cleaning is preferably performed to remove the shavings. Also, using the femtosecond-order pulsed laser beam L can smoothen the surfaces of the machining marks A or reduce the size of the machining marks A compared with the case of the nanosecond-order pulsed laser beam L. Accordingly, a depressed portion 13 having flatter inclined surfaces 13a and 13b or a finer depressed portion 13 can be formed.

The output of the pulsed laser beam L should be low enough not to break the wavelength conversion member 10. Specifically, the output of the femtosecond-order pulsed laser beam L is preferably 100 mW or less. In this range, the wavelength conversion member 10 is less likely to be broken. Also, since the above output allows the maximum width of each machining mark A in a top view to be some micrometers or less, the depressed portion 13 having flatter inclined surfaces 13a and 13b can be formed. A too low output, however, makes the machining difficult, and therefore the femtosecond-order pulsed laser beam L preferably has an output of 30 mW or less. In the case of the femtosecond-order pulsed laser beam L, the maximum lengths in the first direction $B_1$ and the second direction $B_2$ of each machining mark A should be, for example, about 1 to 3 μm each. The length of each machining mark A in the thickness direction of the wavelength conversion member 10 should be, for example, about 1 to 3 μm.

The position of the focus of the pulsed laser beam L in the depth direction should be on the surface or its vicinities of the wavelength conversion member 10. With the femtosecond-order pulsed laser beam L, machining marks A can be formed not only on the surface but inside the wavelength conversion member 10. Internal machining, however, may break the wavelength conversion member 10 in the thickness direction. For this reason, the focus of the femtosecond-order pulsed laser beam L is preferably located within a range of 5 µm from the surface of the wavelength conversion member 10 in the depth direction. The surface of the wavelength conversion member 10 refers to the uppermost surface of a portion to be irradiated with the pulsed laser beam L. For example, the uppermost surface refers to the upper surface 10a in the first Set D of scanning and refers to the bottom surface of the shallow groove 131 in the second Set D of scanning performed on the shallow groove 131 that has been formed in the first Set D of scanning.

The interval between focuses, that is, the pitch of the pulsed laser beam L, in the first direction $B_1$ in each Step C of scanning should be smaller than the maximum length in the first direction $B_1$ of a machining mark A formed by one irradiation with the pulsed laser beam L. This constitution allows the machining marks A to be connected with each other. For example, the pitch of the pulsed laser beam L should be about 5 to 25 nm. A smaller pitch of the pulsed laser beam L makes the surfaces of the resulting depressed portion flatter, and a larger pitch of the pulsed laser beam L makes the surfaces rougher. The pitch of the pulsed laser beam L can be adjusted by changing the feed rate of a tray carrying the wavelength conversion member 10, the repetition frequency of the pulsed laser beam L, or the like.

The shortest distance between the focuses in different Steps C of scanning in the second direction $B_2$ should be smaller than the maximum length in the second direction $B_2$ of a machining mark A formed by one irradiation with the pulsed laser beam L. This constitution allows the machining marks A to be connected with each other. For example, in one Set D of scanning, one Step C of scanning is performed at a position about 1 to 3 µm away in the second direction $B_2$ from the position of the immediately preceding Step C of scanning.

The depressed portion 13 formed by such Step C of scanning and Set D of scanning has, for example, a rectangular shape in a top view. The depressed portion 13 having a desired shape can be formed by adjusting positions and the numbers of times of Step C of scanning and Set D of scanning. For example, a plurality of depressed portions 13 away from each other in the first direction $B_1$ can be formed. Such depressed portions 13 can be formed by applying a laser beam in regions in which the depressed portions 13 are to be formed and not applying the laser beam in regions in which the depressed portions 13 are not to be formed while the tray carrying the wavelength conversion member 10 is moving along the first direction $B_1$. A depressed portion 13 having a circular shape in a top view can also be formed in this manner.

A plurality of depressed portions 13 can be formed in the wavelength conversion member 10. In this case, the above forming of the depressed portion 13 is repeated. In the case where a plurality of emitting units of the pulsed laser beam L are provided, the depressed portions 13 can be formed at once. In the case where only one emitting unit of the pulsed laser beam L is provided, to form a plurality of depressed portions 13, Step C of scanning at a fixed processing depth is preferably performed across the whole wavelength conversion member 10 rather than forming the depressed portions 13 one by one. For example, Step C of scanning at the shallowest processing depth is performed in a region in which one depressed portion 13 is to be formed, and Step C of scanning is then successively performed at substantially the same processing depth in a region in which an another adjacent depressed portion 13 is to be formed. The number of changes in the processing depth is thus reduced compared with the case where the depressed portions 13 are formed one by one, thereby shortening the machining time required for completing formation of a plurality of depressed portions 13.

Method for Manufacturing Light-Emitting Device 20

Figure 3C:
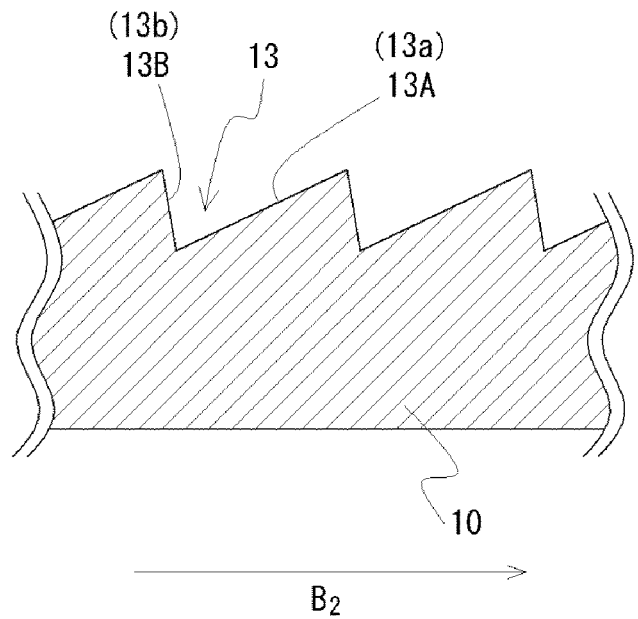
FIG. 3C is a schematic, partial, enlarged view of FIG. 3B.
Figure 3D:
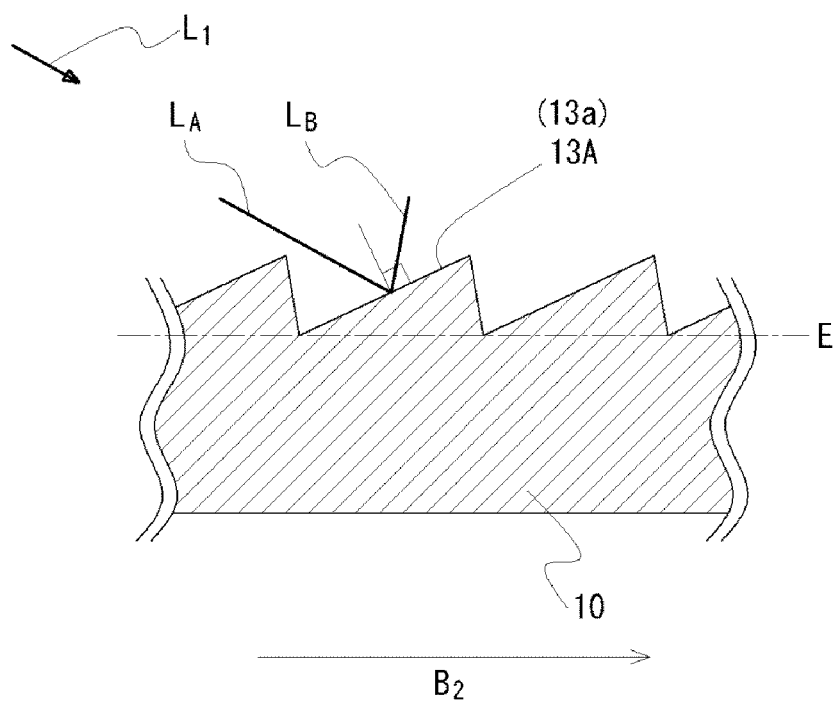
FIG. 3D is a schematic, partial, enlarged view of FIG. 3B.

Also, the light-emitting device 20 that includes the wavelength conversion member 10 having the depressed portion 13 can be manufactured. FIG. 3A is a schematic top view of the resulting light-emitting device 20. FIG. 3B is a schematic sectional view taken along the line 3B-3B in FIG. 3A. FIG. 3C and FIG. 3D are schematic, partial, enlarged views of FIG. 3B. A method for manufacturing the light-emitting device 20 includes fixing a laser light source 21 and the wavelength conversion member 10 having the depressed portion 13 so that they have a predetermined positional relation. The laser light source 21 emits the first light. The first light excites the phosphor contained in the wavelength conversion member 10 in order to emit the second light. The predetermined positional relation refers to such a positional relation that the depressed portion 13 is irradiated with the first light.

In the light-emitting device 20, the wavelength conversion member 10 is irradiated at its surface having the depressed portion 13 with the first light from the laser light source 21, and thus reflection or the like of the light on the surface of the wavelength conversion member 10 is controlled by the shape of the depressed portion 13. Also, the first light and the second light can be extracted from the same surface of the wavelength conversion member 10 as the surface irradiated with the first light. In this case, the laser light source 21 is preferably not disposed directly above the wavelength conversion member 10 so as not to block the paths of the first and second light from the wavelength conversion member.

Inclined surfaces of the depressed portion 13 preferably include a first surface 13A as shown in FIG. 3C. The first surface 13A is inclined with respect to the upper surface 10a so that light directly incident on the first surface 13A along an optical axis Li of the first light is regularly reflected upward. With this first surface 13A, the wavelength conversion member 10 easily reflects upward the first light applied from a slant direction with respect to a reference plane E. The phosphor contained in the wavelength conversion member 10 is excited by the first light to emit the second light (fluorescence) mainly upward. The direction in which the first light reflected by the wavelength conversion member 10 has the maximum intensity is thus close to the direction in which the second light has the maximum intensity, thereby providing the light-emitting device 20 having the improved light extraction efficiency. A specific shape of the first surface 13A will be further described. Letting a plane including the bottoms of a plurality of depressed portions 13 be the reference plane E, the first surface 13A is formed so that the reference plane E is inclined with respect to the optical axis Li of the first light. In addition, the first surface 13A is inclined with respect to the reference plane E so that light directly incident on each of the depressed portions 13 along the optical axis Li of the first light is regularly reflected upward. This structure allows the first light applied from a slant direction with respect to the reference plane E to be more certainly reflected upward.

Preferably, the depressed portions 13 each extend in the first direction $B_1$ in a top view. This structure allows the first light to be reflected upward on comparatively large planes compared with the case where the upper surface 10a of the wavelength conversion member 10 is simply rough, thereby providing the light-emitting device 20 having good light extraction efficiency.

The depressed portion 13 can have a second surface 13B (inclined surface 13b). The second surface 13B is inclined with respect to the reference plane E at an angle different from the inclination angle of the first surface 13A. That is, in a sectional view as shown in FIG. 3C, the first surface 13A and the second surface 13B are in asymmetry assuming that a line extending perpendicularly to the reference plane E from the point of intersection of the first surface 13A with the second surface 13B is the symmetry axis. The above method for forming the depressed portion 13 allows the first surface 13A and the second surface 13B having desired inclinations to be formed through adjustment of the positions at which the machining marks A are formed. The first surface 13A and the second surface 13B that are asymmetric can be thus formed.

The second surface 13B, which intersects with the first surface 13A, is preferably at a larger angle to the reference plane E than the first surface 13A is, as shown in FIG. 3D. The first light is applied from a slant direction with respect to the reference plane E. Hence, the second surface 13B is less likely to be irradiated with the first light. For this reason, the length of the second surface 13B in a top view in the second direction $B_2$ is reduced by increasing the inclination angle of the second surface 13B. This reduction reduces the interval between regions directly irradiated with the first light, thereby making the luminance distribution more uniform. Of the angles to the reference plane E, the inclination angle refers to an angle of 90° or less. The description that light is "directly incident" or "directly applied" in the present specification means that light having not been reflected or the like on an irradiated surface of the wavelength conversion member 10 enters a certain surface of the wavelength conversion member 10. Incidence of light on a certain surface of the wavelength conversion member through a lens or the like is not excluded.

The first surface 13A of the depressed portion 13 has the following relations with a straight line (line $L_A$ in FIG. 3D) parallel to the optical axis Li of the first light. First, the first surface 13A is not perpendicular to the line $L_A$ parallel to the optical axis Li of the first light. Second, the line $L_A$ directly intersects with the first surface 13A of one depressed portion 13. These relations allow the first light to be directly applied to at least part of the first surface 13A. Also, as shown in FIG. 3D, light traveling upward from the wavelength conversion member 10 is represented by a straight line (line $L_B$ in FIG. 3D). The straight line $L_B$ and the line $L_A$ are in line symmetry about a straight line perpendicular to the first surface 13A. The first surface 13A having such relations with the line $L_A$ can reflect the first light incident on it upward.

The upward direction is, in other words, the light-extracting direction. For example, a direction in a range of about −30° to +300 from a direction perpendicular to the reference plane E can be referred to as the upward direction. In the case where the light-emitting device 20 has an opening for extracting light, the direction toward the opening is the upward direction.

The wavelength conversion member 10 preferably has a plurality of depressed portions 13 in a range irradiated at once with the first light from the laser light source 21. This structure reduces imbalances in the distribution of emission intensity of the first light in a top view. Specifically, the depressed portions 13 can each have a width in a range of 5 µm to 80 µm. The depressed portions 13 can each have a depth in a range of 3 µm to 35 µm. In the case of the depressed portions 13, as shown in FIG. 3C and FIG. 3D, each having a shape in which the bottom and its vicinities are not directly irradiated with the first light from the laser light source 21, the widths of the depressed portions 13 are preferably reduced. This reduction reduces the interval between regions directly irradiated with the first light, thereby making the luminance distribution more uniform. Specifically, the depressed portions 13 each preferably have a width in a range of 5 µm to 20 µm. In this case, the depressed portions each preferably have a depth in a range of, for example, 3 µm to 10 µm. From another viewpoint, the depressed portions 13 each preferably have a depth that measures 30% or less of the thickness of the wavelength conversion member 10. In this range, the wavelength conversion member 10 is less likely to be broken. The width of the depressed portion 13 refers to the shortest distance from one end to the other end of the depressed portion 13 in the second direction $B_2$ in a top view. The depth of the depressed portion 13 refers to the shortest distance from the reference plane E to the top of the depressed portion 13.

It is preferable that the depressed portion 13 be sufficiently long in the first direction $B_1$ in a top view to allow the first surface 13A to function as a specular surface. Specifically, the length of the depressed portion 13 in the first direction $B_1$ can be larger than the width thereof. For example, the length of the depressed portion 13 in the first direction $B_1$ is equal to the length of the wavelength conversion member 10 in the first direction $B_1$.

The laser light source 21 emits the first light that excites the phosphor portion contained in the wavelength conversion member 10. Examples of the laser light source 21 include semiconductor laser elements. A combination of a semiconductor laser element and at least one member such as an optical member including a lens, a fiber, and a reflector may be referred to as the laser light source 21. The first light emitted by the laser light source 21 is a laser beam (coherent light) from the time the first light is emitted from the laser light source 21 until the first light reaches the wavelength conversion member 10. The first light may be non-laser light (incoherent light) after being reflected on the irradiated surface of the wavelength conversion member 10 or being extracted to the outside through the wavelength conversion member 10. Regardless of whether the light is laser light or not, light (such as blue light) that originates from the laser light source 21 and has not been converted is referred to as the first light in the present embodiment.

The first light can have a peak wavelength in a range of, for example, 350 nm to 600 nm. In the case where a yellow phosphor such as a YAG phosphor is combined to provide white light, the first light preferably has a peak wavelength in a range of 430 nm to 460 nm. Examples of a light source that emits a laser beam having such a peak wavelength include GaN semiconductor laser elements. A GaN semiconductor laser element has, for example, a quantum well structure including a well layer of InGaN.

Second Embodiment

Figure 4A:
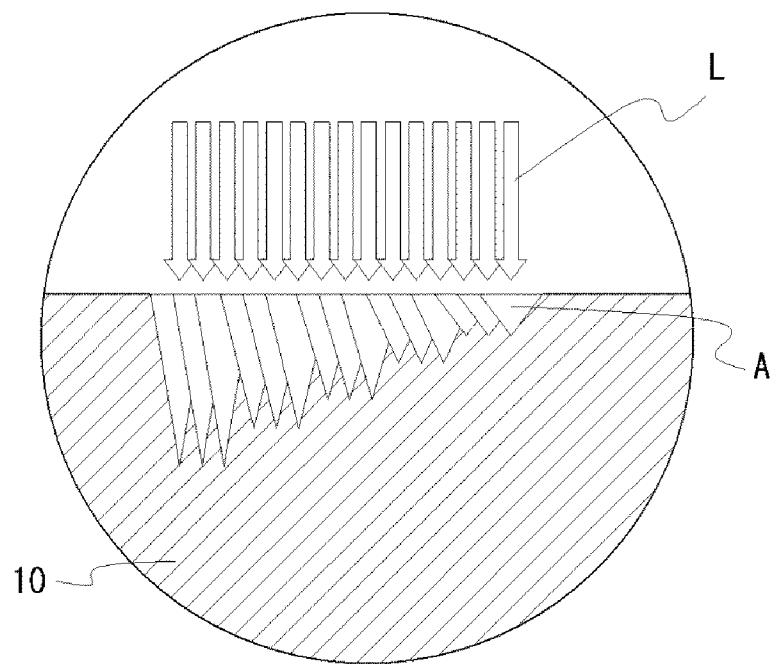
FIG. 4A is a schematic sectional view for illustrating a method for manufacturing a wavelength conversion member having a depressed portion according to a second embodiment.

FIG. 4A is a schematic sectional view for illustrating a method for manufacturing the wavelength conversion member 10 having the depressed portion 13 according to a second embodiment. FIG. 4A is a schematic enlarged view of part of the wavelength conversion member 10. The method for manufacturing the wavelength conversion member 10 having the depressed portion 13 according to the second embodiment differs in the forming of the depressed portion 13 from the manufacturing method in the first embodiment. The other part of the method is the same as the manufacturing method in the first embodiment. For members and steps that are not described, materials and conditions in the first embodiment can be employed.

Figure 4B:
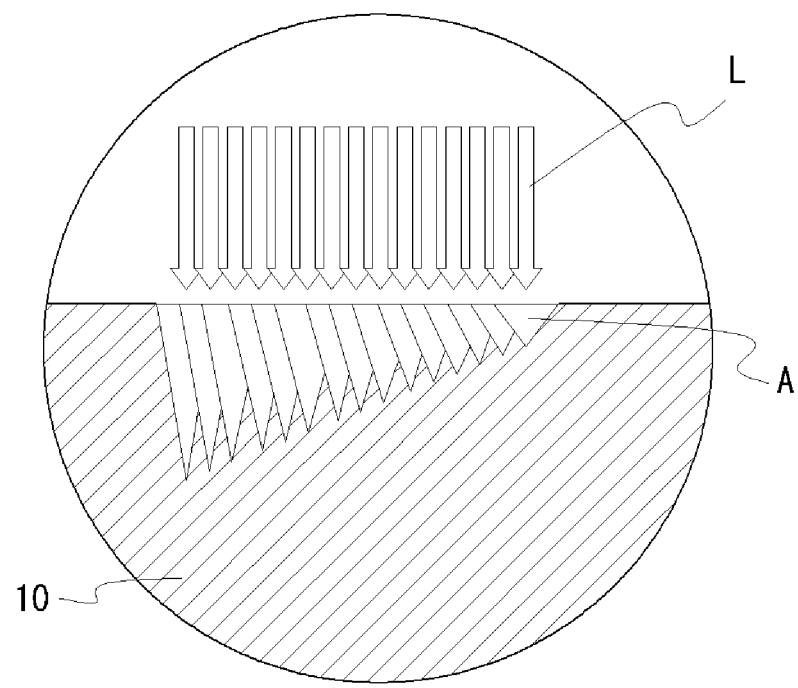
FIG. 4B is a schematic sectional view for illustrating a variation of the second embodiment.

In forming of the depressed portion 13 in the manufacturing method according to the second embodiment, the wavelength conversion member 10 is irradiated with the pulsed laser beam L from above more than once to form a plurality of continuous machining marks A at different processing depths, as shown in FIG. 4B, or to form a plurality of continuous sets of machining marks A at different processing depths, the sets of machining marks A each including a plurality of continuous machining marks A at a fixed processing depth, as shown in FIG. 4A. The depressed portion 13 having the inclined surfaces 13a and 13b inclined with respect to the upper surface 10a is thus formed. That is, in the forming of the depressed portion 13 in the second embodiment, Step C of scanning is performed more than once at irradiation positions shifted in the second direction $B_2$ and at different processing depths. As described above, Step C of scanning is scanning in the first direction $B_1$ with the pulsed laser beam L at a fixed processing depth. The above step eliminates the need for stacking the machining marks A in the depth direction, thereby shortening the time required for forming one depressed portion 13 compared with the first embodiment. The plurality of the continuous machining marks A may be formed at different processing depths by changing the processing depths for every Step C of scanning, as shown in FIG. 4B.

It is preferable to form a plurality of continuous sets of machining marks A at different processing depths, the sets of machining marks A each including a plurality of continuous machining marks A at a fixed processing depth, as shown in FIG. 4A. That is, it is preferable that Step C of scanning be successively performed more than once at substantially the same processing depth. The time required for laser irradiation is thus shortened because the number of adjustments of the processing depth is less than in the case where the processing depth is changed every Step C of scanning, and the resulting inclined surface 13a will be flatter. The number of continuous Steps C of scanning at a fixed processing depth can be in a range of two to five. The number of five or less facilitates formation of the inclined surface 13a. Steps C of scanning are performed, for example, in the order from the largest processing depth. Step C of scanning at a fixed processing depth is preferably performed across the whole wavelength conversion member 10 to form a plurality of depressed portions 13 rather than forming the depressed portions 13 one by one. The number of changes in the processing depth is thus reduced compared with the case where the depressed portions 13 are formed one by one, thereby shortening the machining time required for completing formation of a plurality of depressed portions 13. The inclined surface 13b, which intersects with the inclined surface 13a, may be defined by one machining mark A.

Such a step is suitable for the case where a laser beam having a nanosecond-order pulse width is used for the pulsed laser beam L. In this case, the processing depth can be changed by changing the output with the depth of the focus of the pulsed laser beam L being fixed. Specifically, a larger output offers a larger processing depth. The nanosecond-order pulse width is, for example, 1 to 25 ns.

Since a too low output of the nanosecond-order pulsed laser beam L makes the machining difficult, the minimum output among different outputs of a plurality of Steps C of scanning is preferably 30 mW or more, more preferably 50 mW or more. On the other hand, since a too large processing depth may cause breakage of the wavelength conversion member 10, the maximum output among different outputs of a plurality of Steps C of scanning is preferably 500 mW or less. The amount of change in output for changing the processing depth is, for example, 30 mW or more. This output facilitates formation of the inclined surface 13a. To form a smooth inclined surface 13a, the amount of change in output is preferably 200 mW or less. The focus of the pulsed laser beam L should be located on the surface or its vicinities of the wavelength conversion member 10. Specifically, the focus of the pulsed laser beam L is preferably located within a range of 20 μm from the upper surface 10a of the wavelength conversion member 10. The interval between the focuses, that is, the pitch of the pulsed laser beam L, in the first direction $B_1$ in each Step C of scanning is preferably 500 nm or more. This is because slowing down the feed rate to reduce the pitch tends to result in a larger processing depth of individual machining marks than expected from the position of the focus in the case where the pulsed laser beam L having a nanosecond-order pulse width is used. For example, the pitch of the pulsed laser beam L should be about 500 to 800 nm. The shortest distance in the second direction $B_2$ between focuses of a plurality of Steps C of scanning is, for example, about 1 to 5 μm.

The depressed portion 13 formed by such Step C of scanning has, for example, a rectangular shape in a top view. The depressed portion 13 having a desired shape such as a circular shape in a top view can be formed by adjusting positions and the numbers of times of Step C of scanning and Set D of scanning.

Example 1

In Example 1, a wavelength conversion member 10 having a depressed portion 13 with the shape shown in FIG. 1C is produced by the following manufacturing method. First, a wavelength conversion member 10 that included a phosphor portion made of a YAG phosphor and light-transmissive portions made of $Al_2O_3$ is provided. The proportion of the phosphor portion to the whole wavelength conversion member 10 is about 75 vol %, and the proportion of the light-transmissive portions dispersed in the phosphor portion is about 25 vol %. The wavelength conversion member 10 has a substantially square shape with a side of about 1 mm in a top view and has a thickness of about 100 μm.

Next, the wavelength conversion member 10 is irradiated with a pulsed laser beam L to form the depressed portion 13. As the pulsed laser beam L, a laser beam having a wavelength of about 1,030 nm and a pulse width of about 250 fs is used. A fixed output of the laser beam of about 50 mW is used. Set D of scanning including performing Step C of scanning more than once is performed more than once at different processing depths as shown in FIG. 2A to FIG. 2F. In each Step C of scanning, the feed rate of the wavelength conversion member 10 is about 2 mm/sec, and the repetition frequency of the pulsed laser beam is 200 kHz. The difference in the second direction $B_2$ in the positions of focuses of different Steps C of scanning in one Set D of scanning is about 1 μm, and the difference in the depth direction in the positions of focuses of different Sets D of scanning is about 1 μm. The positions and the numbers of times of Step C of scanning and Set D of scanning are adjusted so that the depressed portion 13 having the following shape and dimensions is obtained. That is, the resulting depressed portion 13 is assumed to have a rectangular shape long in the first direction $B_1$ in a top view and to be defined by two inclined surfaces 13a and 13b that have different areas and form a right angle. Also, the dimensions of the depressed portion 13 are assumed to be 10 μm in depth and 14 μm in width. Set D of scanning is performed about 10 times, and Step C of scanning is performed about 95 times in total to form such a depressed portion 13. After the depressed portion 13 is formed in the wavelength conversion member 10, cleaning with water is performed to remove debris.

Figure 5:
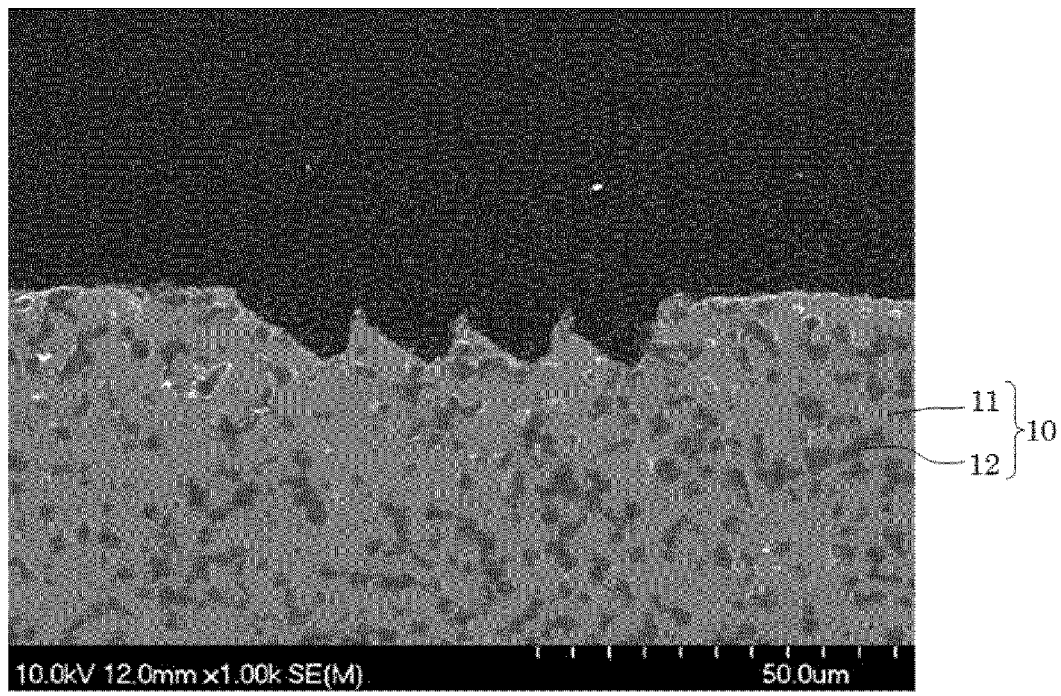
FIG. 5 is a scanning electron microscope (SEM) image of a section of a wavelength conversion member in Example 1.

FIG. 5 shows a section of the wavelength conversion member 10 having the resulting depressed portion 13, the section being perpendicular to the upper surface 10a and taken along the second direction $B_2$. FIG. 5 is a scanning electron microscope (SEM) image. As shown in FIG. 5, the wavelength conversion member 10 includes a phosphor portion 11 and light-transmissive portions 12. A portion covering a large area is the phosphor portion 11, and a plurality of portions that are darker in color than the phosphor portion 11 and are surrounded by the phosphor portion 11 are the light-transmissive portions 12. The resulting depressed portion 13 has a width of about 12 μm and a depth of about 6 μm. The two inclined surfaces 13a and 13b constituting the depressed portion 13 form an angle of about 70°. Formation of the depressed portion 13 having nearly flat inclined surfaces 13a and 13b as shown in FIG. 5 is achieved by performing Set D of scanning including a plurality of Steps C of scanning more than once successively downward in regions overlapping each other in a top view.

Example 2

A method for manufacturing a wavelength conversion member 10 having a depressed portion 13 in Example 2 differed from Example 1 in that the depressed portion 13 is formed by performing Step C of scanning more than once at different processing depths as shown in FIG. 4A. The wavelength conversion member 10 provided in Example 2 is substantially the same as the wavelength conversion member 10 in Example 1 except that the proportion of the phosphor portion to the whole wavelength conversion member 10 is about 90 vol % and that the proportion of the light-transmissive portions is about 10 vol %. In Example 2, a laser beam having a wavelength of about 350 nm and a pulse width of about 25 ns is used for the pulsed laser beam L. In each Step C of scanning, the moving speed of the relative position of an irradiation unit of the pulsed laser beam L to the wavelength conversion member 10 is about 30 nm/sec, and the repetition frequency of the pulsed laser beam is 60 kHz. The difference in the second direction $B_2$ in the positions of focuses of different Steps C of scanning is about 2 μm. Step C of scanning is performed five times at each of laser beam outputs of about 500 mW, about 400 mW, about 300 mW, about 200 mW, about 100 mW, and about 50 mW, which are used in this order. A dark-colored deteriorated layer is adhered to the surfaces of the depressed portion 13 after machining. The deteriorated layer is removed by immersion in a mixed solution of phosphoric acid and sulfuric acid at about 100 to 150° C. for about 40 minutes.

Figure 6:
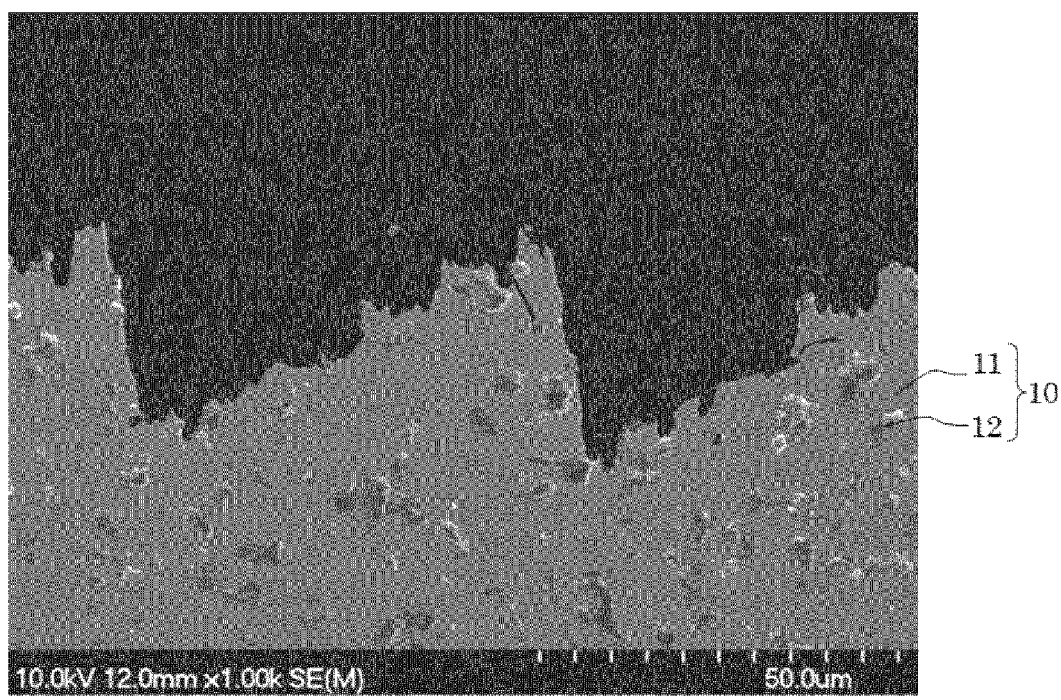
FIG. 6 is an SEM image of a section of a wavelength conversion member in Example 2.

FIG. 6 shows a section of the wavelength conversion member 10 having the resulting depressed portion 13, the section being perpendicular to the upper surface 10a and taken along the second direction $B_2$. FIG. 6 is an SEM image. In FIG. 6, a portion covering a large area is the phosphor portion 11, and a plurality of portions that are darker in color than the phosphor portion 11 and are surrounded by the phosphor portion 11 are the light-transmissive portions 12. The depressed portion 13 has a width of about 60 μm and a depth of about 30 μm. The two inclined surfaces 13a and 13b constituting the depressed portion 13 form an angle of about 70°. Formation of the depressed portion 13 having the inclined surfaces 13a and 13b as shown in FIG. 6 is achieved by performing Step C of scanning more than once at different processing depths. Example 2 offers about one-sixth the machining time of Example 1 on the basis of the machining time per area of 1 $mm^2$ in a top view.

A wavelength conversion member having a depressed portion and a light-emitting device including the wavelength conversion member obtained by manufacturing methods in the present disclosure can be used for various applications that require light having undergone wavelength conversion, in particular, applications that require high-power white light. Examples of such applications include use as light sources for lighting apparatuses for indoor and outdoor use and lighting apparatuses (such as headlights) for vehicles.

The invention claimed is:

1. A wavelength conversion member manufacturing method comprising:
   providing the wavelength conversion member having an upper surface, the wavelength conversion member including
      a phosphor portion, and
      a light-transmissive portion configured to transmit fluorescence from the phosphor portion; and
   forming, in the wavelength conversion member, at least one depressed portion each having an inclined surface inclined with respect to the upper surface by irradiating the wavelength conversion member with a pulsed laser beam from above more than once to form a plurality of continuous machining marks at different processing depths.

2. The wavelength conversion member manufacturing method according to claim 1, wherein
   the forming of the at least one depressed portion includes forming a plurality of depressed portions including the at least one depressed portion.

3. The wavelength conversion member manufacturing method according to claim 1, wherein the forming of the at least one depressed portion includes irradiating the wavelength conversion member with the pulsed laser beam having a nanosecond-order pulse width.

4. The wavelength conversion member manufacturing method according to claim 1, wherein
   the forming of the at least one depressed portion includes irradiating the wavelength conversion member with the pulsed laser beam having a pulse width of 1 to 25 ns.

5. The wavelength conversion member manufacturing method according to claim 1, wherein
   the phosphor portion is made of YAG phosphors or LAG phosphors.

6. The wavelength conversion member manufacturing method according to claim 1, wherein
   the light-transmissive portion is made of $Al_2O_3$.

7. The wavelength conversion member manufacturing method according to claim 1, wherein
   a proportion of the phosphor portion to the wavelength conversion member is 60 to 90 vol %.

8. A method for manufacturing a light-emitting device, the method comprising:
   fixing
      the wavelength conversion member obtained by the wavelength conversion member manufacturing method according to claim 1, and
      a laser light source configured to emit first light by which the phosphor portion in the wavelength conversion member is excited to emit second light, in a positional relation in which the at least one depressed portion is irradiated with the first light.

9. The method for manufacturing the light-emitting device according to claim 8, wherein
the inclined surface of the at least depressed portion has a first surface that is inclined with respect to the upper surface and is configured to regularly reflect light directly applied along an optical axis of the first light upward.

* * * * *